May 6, 1958     O. E. CARLSON     2,833,974
ELECTRONIC MOTOR SPEED CONTROL
Filed June 21, 1956
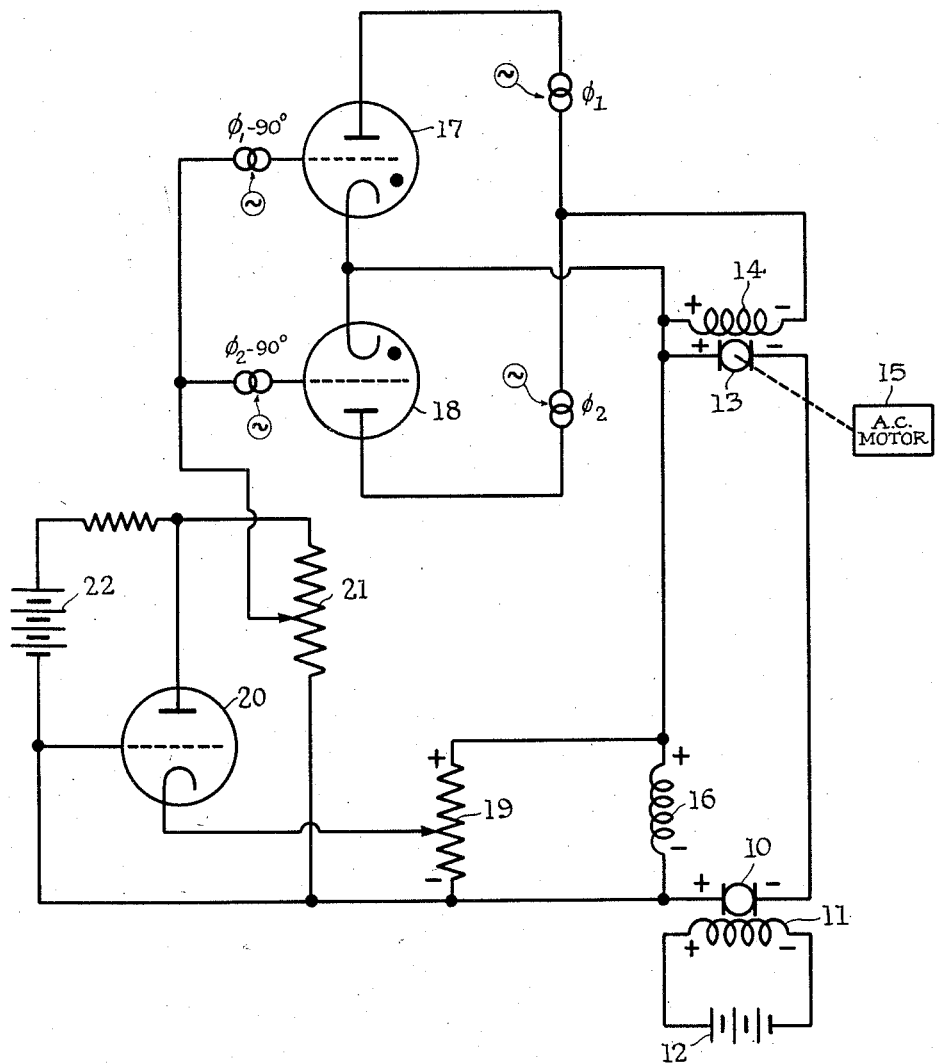
INVENTOR
Oscar E. Carlson
BY *Kemon and Palmer*
ATTORNEYS 2,833,974
ELECTRONIC MOTOR SPEED CONTROL

Oscar E. Carlson, Paterson, N. J.

Application June 21, 1956, Serial No. 592,976

4 Claims. (Cl. 318—144)

This invention relates to electronic motor speed controls, and more particularly to an electronic control for a motor generator set.

Motor generator sets, even going back as far as the Ward-Leonard systems, have suffered inherently from poor speed regulation. In the Ward-Leonard system, of course, a simple rheostat is used to control the field excitation of the generator which supplies the motor. Recently, there have been some attempts to apply thyratron control systems to motor generator sets.

It is an object of the present invention to adapt a thyratron control system to a motor generator set.

It is a further object to provide a thyratron control system in which the feed back loop includes as a source of error signal, the voltage which appears across a series or inter-pole winding of either the motor or the generator.

Other objects and advantages of the present invention will be apparent from the following description read in conjunction with the attached sheet of drawings, in which the single figure shows a preferred embodiment in schematic form.

Referring now to the drawing, the D. C. motor armature is shown at 10 and its field winding at 11. The source of energy for the field winding is schematically indicated as a battery 12. Obviously, any constant source of energy for the field of the motor may be employed.

In contrast to conventional thyratron motor speed control systems, the source of energy for the armature of the D. C. motor in this instance is a D. C. generator which includes an armature 13 and a field winding 14. An essential part of the present system is a prime mover 15 which is mechanically coupled to the armature of the generator in order to drive the armature at constant speed. Conveniently, such prime mover may take the form of an alternating current motor.

The armature 13 of the generator is electrically connected to the armature of the motor 10, in order that the applied armature voltage of the motor will be determined by the output of the D. C. generator. At 16, there is shown a field winding which is connected in series between the motor and generator armatures. While this winding is shown schematically in the drawing, it could be a part of the physical structure of either the motor or the generator. Thus, the winding 16 could be a series field winding for either the motor or generator, or it could be an inter-pole winding. Insofar as the control circuit, which will be described hereinafter, is concerned, the essential requirement of the winding 16 is that it carry the load current of the motor or at least a current which is proportional to the motor load current.

With the circuit as thus far described, and assuming energization of the field winding 14 of D. C. generator, it will be apparent that the D. C. motor will run when energized, at a speed which depends upon the applied voltage, as well as the mechanical load on the motor shaft. The remainder of the circuit shown in the drawing has as its purpose the provision of a varying energization of the field winding of the generator. The amount of energization, is dependent upon the speed, and therefore upon the load on the motor shaft.

A pair of thyratrons 17 and 18 are shown connected in a full wave rectifier circuit to supply from an alternating current source, a D. C. voltage to the field winding 14 of the D. C. generator. As indicated schematically on the drawing, the grid circuits of the thyratrons are connected together and each grid is supplied with an alternating current voltage which is substantially 90° out of phase with the anode voltage. Such a circuit is conventional in thyratron motor control circuits, and a detailed explanation of its operation is not believed to be necessary in the present specification.

As will be apparent to those skilled in this art, it is necessary to provide a special feed back loop between the motor armature circuit and the grid circuit of the thyratrons in order to achieve good speed regulation. If such a feed back loop were to start with the voltage appearing across the armature of the motor, a fair degree of regulation would be achieved. Such a circuit, however, would suffer from the drawback that there would be little or no compensation for the voltage drop in the armature of the motor as the current varies under varying loads.

In order to provide a proper starting point for the feed back loop which will provide compensation for voltage drop in the armature circuit under varying motor loads, the present invention contemplates the use of a series field winding which carries the motor load current. This winding which is shown on the drawing at 16 may, as has been hereinbefore stated, be a series or inter-pole winding of either the motor or the generator. The important consideration is that it carry the armature current of the motor, or at least a current which is proportional to armature current. Connected across the winding 16 is a voltage divider in the form of a potentiometer 19, the movable arm of which is used to pick off a portion of the voltage which appears across the winding 16. In order to utilize the voltage thus appearing across the winding 16 in a feed back loop, an amplifier 20 is provided which may be any conventional triode or similar vacuum tube. The voltage from potentiometer 19 is connected directly between the cathode and grid of the amplifier 20. In order to provide a standard or reference voltage which may be adjusted either manually or automatically in accordance with the speed of a particular process in which the present invention is employed, a second potentiometer 21 is connected in series with the plate load resistor of amplifier tube 20. The plate load resistor and the potentiometer in series are connected across a source of D. C. voltage shown schematically in the drawing as a battery 22. The variable arm of potentiometer 21 is connected to the grid circuit of the thyratrons 17 and 18. From the polarities shown in the drawing, it will be apparent that the voltage appearing across the field winding 16, and consequently the potentiometer 19, opposes the voltage which is developed across the potentiometer 21. In other words, the error signal from the motor circuit is bucking the reference voltage and the difference of the two is superimposed on the phase shifted alternating current voltage supplied to the grids of the thyratrons.

The operation of the control circuit is as follows. Assume that the motor is running at a desired speed and under a predetermined load. Next assume that the load on the motor is increased. The motor, of course, will tend to slow down and the voltage drop through its armature increases. The increased voltage drop in the armature, is, of course, due to increased current, and the increased armature current also is flowing in the field winding 16. Consequently, with a decrease in motor speed, the voltage drop across the field winding 16 also increases so that a more negative voltage is applied to the grid of the amplifier 20, resulting in reduced current therein. This results in a more strongly positive D. C. voltage being supplied to the grids of the thyratrons 17 and 18, thus increasing the percentage of time of each alternating current cycle, during which the thyratrons are supplying energy to the field winding 14 of the D. C. generator. The net result is an increase in energization of the field winding of the generator, which increases the voltage applied to the armature of the motor to bring the motor speed back to the desired speed which has been predetermined by the setting of the potentiometer 21. Thus, the voltage, which appears across the series field winding is utilized as a torque signal source in order to raise the reference voltage in direct proportion to the load on the motor. Stated in another way, the increased thyratron conduction resulting from a higher torque signal in the feed back loop, increases the generator field voltage to raise the generator armature voltage to apply higher D. C. voltage to the motor armature to prevent speed drop off with load.

The foregoing description applies to a preferred embodiment illustrated in the accompanying drawings, and applicant claims the benefit of a full range of equivalents within the scope of the appended claims.

I claim:

1. An electronic speed control for a D. C. motor comprising: a D. C. generator including an armature and a field winding; a prime mover coupled to said generator for driving said generator at constant speed; means for energizing said generator field winding including grid controlled gaseous rectifier means connected between a source of A. C. voltage and said winding; a D. C. motor; means connecting the output of said generator armature to the armature of said motor; means for immersing the armature of said motor in a unidirectional magnetic field; a series field winding connected in series between the motor and generator armatures; grid controlled vacuum tube amplifier means; means connecting at least a portion of the voltage appearing across said series field winding between the cathode and grid of said amplifier; means providing a D. C. voltage; means for varying said D. C. voltage in proportion to the conductivity of said vacuum tube amplifier, whereby said D. C. voltage becomes a motor load compensated reference voltage; means for supplying the grid of said gaseous rectifier means with an A. C. voltage which is substantialy 90° out of phase with the anode voltage; and means for superimposing said load compensated D. C. reference voltage on said A. C. grid voltage.

2. The combination as defined by claim 1 in which said series field winding forms a part of the field structure of said D. C. motor.

3. The combination as defined by claim 1 in which said series field winding forms a part of the field structure of said D. C. generator.

4. An electronic speed control for a D. C. motor comprising: a D. C. generator including an armature and a field winding; a prime mover coupled to said generator for driving said generator at constant speed; a pair of thyratrons connected in a full wave rectifier circuit to energize the generator field winding from an A. C. source; a D. C. motor; means for applying the armature voltage of said generator to the armature of said motor; means for immersing the armature of said motor in a unidirectional magnetic field; a series field winding connected in series between the generator and motor armatures; grid controlled vacuum tube amplifier means; a voltage divider connected across said series field winding; means connecting said voltage divider between the grid and cathode of said amplifier; means providing a D. C. voltage; means for varying said D. C. voltage in proportion to the conductivity of said vacuum tube amplifier, whereby said D. C. voltage becomes a motor load compensated reference voltage; means for supplying the grid of said gaseous rectifier means with an A. C. voltage which is substantially 90° out of phase with the anode voltage; and means for superimposing said load compensated D. C. reference voltage on said A. C. grid voltage.

References Cited in the file of this patent

UNITED STATES PATENTS

| | | |
|---|---|---|
| 2,550,122 | Osbon | Apr. 24, 1951 |
| 2,554,695 | Brown | May 29, 1951 |